United States Patent [19]

Lingemann

[11] Patent Number: 5,000,996

[45] Date of Patent: Mar. 19, 1991

[54] FILLER MATERIAL FOR SPACER RODS OR SPACER FRAME OF INSULATED GLASS

[75] Inventor: Horst Lingemann, Wuppertal, Fed. Rep. of Germany

[73] Assignee: Helmut Lingemann GmbH & Co., Fed. Rep. of Germany

[21] Appl. No.: 389,996

[22] Filed: Aug. 7, 1989

[30] Foreign Application Priority Data

Feb. 2, 1989 [DE] Fed. Rep. of Germany ... 8901171[U]

[51] Int. Cl.[5] .................... B32B 1/06

[52] U.S. Cl. .................... 428/72; 428/76; 428/178; 428/195; 428/196

[58] Field of Search .................... 428/72, 76, 178, 195, 428/196

[56] References Cited

U.S. PATENT DOCUMENTS 4,576,841 3/1986 Lingemann .................... 428/72

FOREIGN PATENT DOCUMENTS 298019 4/1972 Fed. Rep. of Germany .
2508466 8/1975 Fed. Rep. of Germany .
2713968 10/1978 Fed. Rep. of Germany .
8109514 1/1982 Fed. Rep. of Germany .
3047338 7/1982 Fed. Rep. of Germany .
3143659 5/1983 Fed. Rep. of Germany .
8130399 5/1985 Fed. Rep. of Germany .

*Primary Examiner*—Alexander S. Thomas
*Attorney, Agent, or Firm*—Jones, Askew & Lunsford

[57] ABSTRACT

Filler material for placement in spacer elements of window glass. A length of flexible tubing has sections filled with a pourable absorption filler material, and has other sections empty of absorption material. The sectioned tube can be cut to the desired length without loss of absorption material if the tube is cut in the area of an unfilled tube section. If the separation point lies in the area of a filled tube section, then only a minor loss of the filler material in that tube section takes place. The loss of absorption material thus is avoided or significantly reduced.

16 Claims, 1 Drawing Sheet

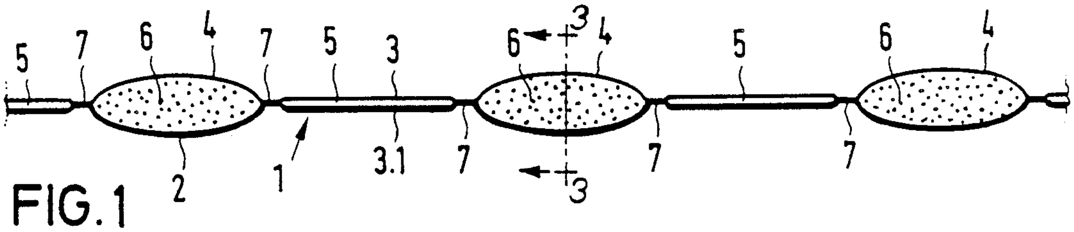
FIG. 1
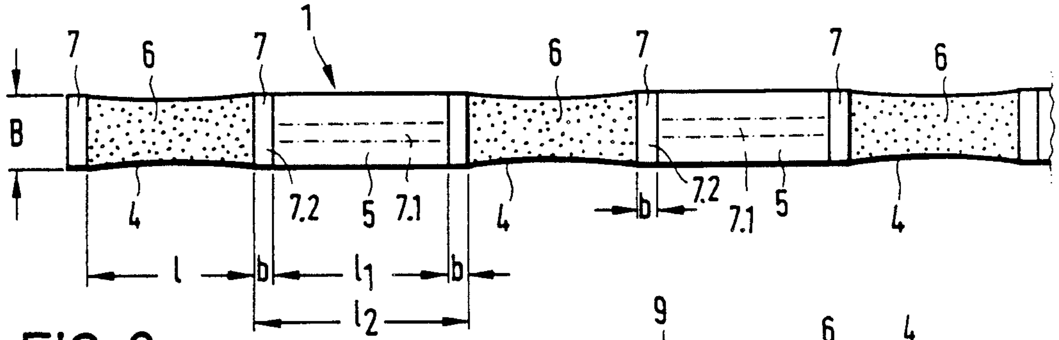
FIG. 2
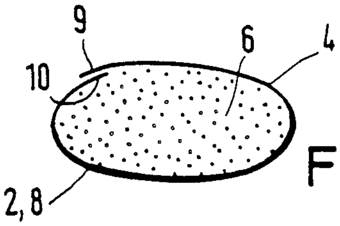
FIG. 3
FIG. 4
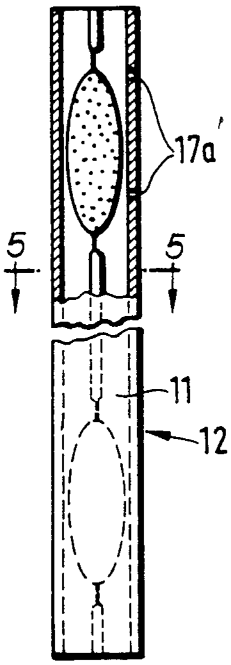
FIG. 5
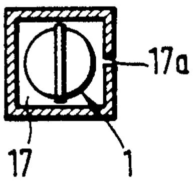
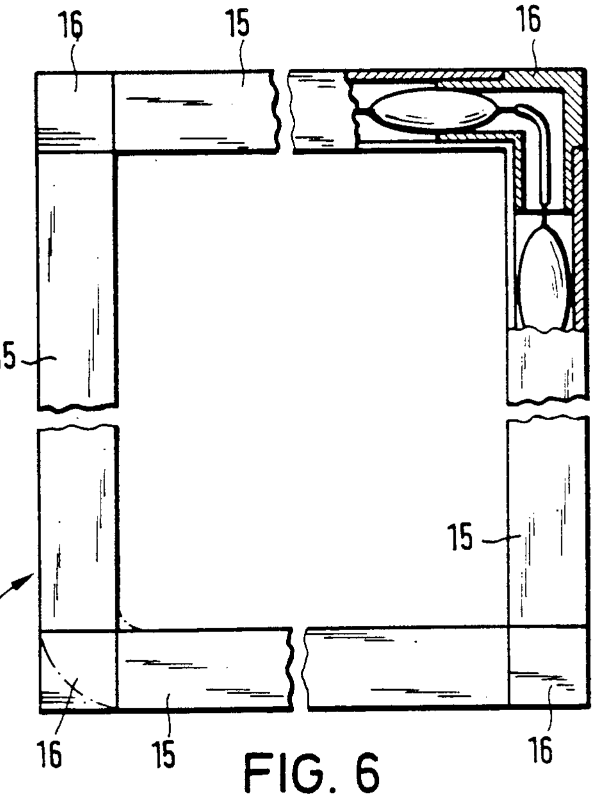
FIG. 6

FILLER MATERIAL FOR SPACER RODS OR SPACER FRAME OF INSULATED GLASS

The invention pertains to a filler material for placement in spacer elements of window glass.

A filler material of this type is described in German patent specification No. 3,141,294. For this known filler material, the powdery-adsorption material lattice consists of a tube produced easily and at low cost in many different ways.

When filling the spacer with said tube, the tube has to be cut to the proper length from a coiled material. At the cut ends the tube requires a seal since it can drain both before and after contraction into the spacer; this needs to be prevented in order to avoid losses, and also to prevent the adsorption material from running into the cavity of the spacer. Sealing of the tube is time and labor-consuming. The known tube is relatively stiff due to solid filling, so that handling in the spacer is difficult. Its placement in the corner areas of the spacer frame is hardly possible due to its stiffness.

These disadvantages also apply to the German Patent Disclosure No. 2,508,466 and French Patent Disclosure No. 2,518,158 filler materials, where the adsorption material is placed into box-like chambers covered by covering strips (of two-part design). In addition, these configurations requires significant material and production effort.

Since modern adsorption materials with relatively high capacity are available, only about 50% filling of the spacer with filler material is needed, so considerable savings in material costs and filler can be achieved. Filling of the tube to about 50%, per German patent specification No. 3,141,294 is of no use, since the adsorption material could migrate into the tube and also a uniform distribution would not be assured.

In order to have about 50% filling, it has already been suggested to fill only two sides of a spacer frame with filler material. But this method also leads to non-uniform distribution of the filler and it cannot be implemented in a continuous production of spacer frames from coiled material. In addition, when using spacer rods and intermediates holding filler material, different intermediates (prefilled components), namely rods with and without filler, have to be stored and kept ready.

The invention is based on the objective of creating a pourable filler material that allows a lower filling level for essentially a homogeneous distribution along the length of a spacer that can also be cut to length without notable loss of adsorption material. The filler should also be simple and inexpensive to produce and be usable for filling spacer frames with curved corners.

In the invented design, the tube has sections filled with adsorption material and sections not filled; of them the filled tube sections alternate at regular or irregular intervals with the empty ones, i.e., only every second or third tube section is filled with adsorption material. The number of filled tube sections is determined according to the capacity of the used adsorption material. Given the capacity of modern, standard adsorption materials, filling of about 50% of the cavity of the spacer profile is enough to guarantee the adsorption of any moisture present between the insulating glass panes. In the invented design, the filler material can be cut to length without loss of adsorption material and even with no wear on the separation points if they lie in the area of an unfilled tube section. If the separation point lies in the area of a filled tube section, then a minor loss in this tube section is unavoidable and has to be accepted, or the separation point has to be sealed. Thus loss of adsorption material is avoided or reduced significantly.

The invented design is characterized also by a simple and low-cost production, because it requires only the joining of opposing wall sections of the tube in order to form the tube sections.

In the invented design, the filled tube sections have the form of a cushion that is easy to handle. The cushions and flat seams ensure the needed rigidity for the filler material. The definition of filler material sites in the cavity of the spacer can be done by clamps or by adhesive. In spite of the required stiffness, the invented tube is very flexible or articulated, so that it can be easily laid into corners or rolled up on rollers and stored.

BRIEF DESCRIPTION OF DRAWINGS

The invention will be explained below with reference to the sample designs shown in the figures. We have:

FIG. 1: A section of the invented filler material, side view,

FIG. 2: A top view of the filler material,

FIG. 3: A cut along line 3—3 of FIG. 1,

FIG. 4: A section of a spacer frame for insulating glass panes forming a spacer having a filler material, FIG. 5: A cut along line 5—5 of FIG. 4, FIG. 6: A spacer frame forming the spacer; said frame with filler material forms an intermediate product.

DETAILED DESCRIPTION OF THE DRAWINGS

Filler material (1) of FIG. 1 has air-permeable tube (2), e.g., a perforated plastic tube. The tube can be flexible and be made of air-permeable fiber material.

The fiber material can be e.g., a fabric and also an arrangement of fibers in the form of a fleece. Tube (2) in the present example is divided at regular intervals by joints running in a transverse direction of its opposing wall sections (3, 3.1) to form tube sections (4, 5) running in series in a longitudinal direction; of them, every other tube section (4) is filled with adsorption material (6), while tube sections (5) are not filled. The joints provide flat seams (7) which give unfilled tube sections (5) a flat shape.

In the present example, width (b) of flat seams (7) is about 2-4 mm and the facings, equal lengths (1) of tube sections (4, 5), are about 25-35 mm for width (b) of a tube about 10 mm. Length (11) of unfilled tube sections (5) can also be larger or smaller than length (1) of filled tube sections (4), and preferably the length (11) of unfilled tube sections (5) is about 0.7-1.3 times the length (1) of filled tube sections (4). The distance (12) between the filled tube sections (4) is thus about 29-43 mm.

FIG. 3 clearly shows that tube (2) is made of a single piece with longitudinal strips (8), whose longitudinal edges (9, 10) are joined preferably by overlapping. This joint and the joint of flat seam (7) can be provided by gluing, pressing and welding while hot or cold.

Refer to the section of spacer (11) illustrated in FIGS. 4 and 5; this can be a so-called semi-finished product, i.e., a supply rod from which smaller sections are removed, whose length and size are that of a finished window, are known; or it can also be sections already cut to a certain length for a window size. In both cases the supply roll or the final cut-frame-section can be kept ready as a prefinished component or intermediate (12).

Such a prefinished component or intermediate (13) can also be a ready-to-install spacer frame (14) (FIG. 6) whose frame sections (15) stretching from corner to corner, are connected together by corner plug-connectors (16). Both described examples of FIGS. 4–6 have a spacer with a rectangular cross section as illustrated in FIG. 5; filler (1) is placed into cavity (17). Since holes (17*a*) are provided in the wall, adsorption of moisture contained between the insulating glass panes (not shown) is assured.

The corners of frame (14) can also be curved, as in FIG. 6 (lower left). Such a frame (16) should be curved continually by a rolled material.

In the sample design of FIG. 6, the filler material can be placed in sections of length appropriate to frame sections (15), or a section of filler material (1) can also be provided, whose length corresponds to the perimeter of the spacer frame.

A stabilized or stiff design for empty tube sections (5) is possible in a simple and low-cost manner by at least one longitudinal and/or transverse flat seam (7.1, 7.2) indicated in FIG. 2, joining opposing wall sections (3, 3.1) of tube (2) together. For the same purpose it is also advantageous to join opposing wall sections (3, 3.1) of tube (2) to each other along the entire surface, in the area of empty tube sections (5) or in the area of tube sections (12) located between filled tube sections (4). As in the case of flat seam (7) and the joining of strip edges (9, 10), the stated joints can be produced by gluing, pressing, sealing or welding while hot or cold.

I claim:

1. Filler material for placement in spacer elements of insulating glass, comprising:

a flexible tube (2) of air- and moisture-permeable material in which a powdered adsorption material (6) is placed, so that the tube comprises filled tube sections (4) filled with the absorption material (6) and empty tube sections (5) located in series with the filled tube sections; and the filled and empty tube sections being separated from each other by flat seams (7).

2. Filler material as in claim 1, wherein the flat seams (7) run at right angles to the longitudinal extent of tube (2).

3. Filler material as in claims 1 or 2, wherein the filled tube sections and empty tube sections (4, 5) alternate.

4. Filler material as in claims 1 or 2, wherein filled and empty tube sections (4, and 5) have substantially equal lengths (1, 11) of about 25–35 mm.

5. Filler material as in claims 1 or 2, wherein the flat seams (7) are formed by an area joint of opposing wall sections (3, 3.1) of the tube, and the width of flat seams (7) is about 2–4 mm.

6. Filler material as in claim 1 or 2, wherein the filled tube sections (4) are loosely filled up to about 70–90% by volume.

7. Filler material as in claims 1 or 2, wherein the tube (2) comprises a fiber material.

8. Filler material claim 1 wherein the tube is selected from the group consisting of textile material, fabric, paper, and perforated foil.

9. Filler material as in claim 1 wherein the tube is made of plastic.

10. Filler material as in claim 1, wherein the tube (2) is made of a one part, elongated strip (8) whose edges (9, 10) are joined together.

11. Filler material as in claim 1, wherein the empty tube sections (5) are stabilized by at least one seam (7.1, 7.2) in the longitudinal or transverse direction relative to the tube (2) and joining the opposing wall sections (3, 3.1) of tube (2) together.

12. Filler material as in claim 1, wherein opposing wall sections (3, 3.1) of empty tube sections (5) are joined together along their entire surface area.

13. Filler material as in claim 1, wherein the filler material is placed in cavity (17) of cut-to-length spacer frame rod (11), so that the frame rod with the filler material form a prefinished component.

14. Filler material as in claim 1, wherein the filler material is placed in cavity (17) of spacer frame (14), so that the frame and filler material form a prefinished component.

15. Filler material as in claim 14, wherein the corners of spacer frame (14) are curved.

16. Filler material as in claim 15, wherein the filler material is provided as a single piece in a section length corresponding to the perimeter of spacer frame (14).

* * * * *